(12) United States Patent
Yoshida et al.

(10) Patent No.: US 9,835,911 B2
(45) Date of Patent: Dec. 5, 2017

(54) LIQUID CRYSTAL DISPLAY DEVICE

(71) Applicant: Sharp Kabushiki Kaisha, Osaka-shi, Osaka (JP)

(72) Inventors: Hidefumi Yoshida, Osaka (JP); Mitsuhiro Murata, Osaka (JP); Yosuke Iwata, Osaka (JP); Satoshi Matsumura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/100,728

(22) PCT Filed: Aug. 22, 2014

(86) PCT No.: PCT/JP2014/072018
§ 371 (c)(1),
(2) Date: Jun. 1, 2016

(87) PCT Pub. No.: WO2015/083401
PCT Pub. Date: Jun. 11, 2015

(65) Prior Publication Data
US 2016/0299394 A1 Oct. 13, 2016

(30) Foreign Application Priority Data
Dec. 2, 2013 (JP) .................. 2013-249464

(51) Int. Cl.
*G02F 1/1343* (2006.01)
*G02F 1/133* (2006.01)
*G02F 1/1333* (2006.01)
*G02F 1/1335* (2006.01)
*G02F 1/1337* (2006.01)
*G02F 1/1368* (2006.01)
*G02F 1/137* (2006.01)

(52) U.S. Cl.
CPC ........ *G02F 1/134363* (2013.01); *G02F 1/137* (2013.01); *G02F 1/1368* (2013.01);
(Continued)

(58) Field of Classification Search
CPC .......... G02F 1/13306; G02F 1/133345; G02F 1/133528; G02F 1/133784;
(Continued)

(56) References Cited

U.S. PATENT DOCUMENTS

2013/0100384 A1* 4/2013 Asakawa ............. G02F 1/1335
349/96
2014/0002762 A1 1/2014 Iwata et al.

FOREIGN PATENT DOCUMENTS

| JP | 07-318959 A | 12/1995 |
| JP | 2010-066645 A | 3/2010 |
| WO | 2012/128061 A1 | 9/2012 |

OTHER PUBLICATIONS

Official Communication issued in International Patent Application No. PCT/JP2014/072018, dated Oct. 28, 2014.

\* cited by examiner

*Primary Examiner* — James Dudek
(74) *Attorney, Agent, or Firm* — Keating & Bennett, LLP

(57) ABSTRACT

The present invention provides a liquid crystal display device in a new display mode that is based on the horizontal alignment capable of giving a wide viewing angle and that can achieve high speed response. The liquid crystal display device includes: a first substrate that includes a pair of electrodes; a second substrate that includes a pixel electrode and a common electrode; and a liquid crystal layer that contains liquid crystal molecules aligned horizontally, at least one of the pair of electrodes including a first linear portion that extends in a first direction, at least one of the pixel electrode and the common electrode including a second linear portion that extends in a second direction intersecting the first direction, the liquid crystal molecules being aligned in a direction perpendicular or parallel to the first direction in a first display state in which voltage is applied (Continued)

between the pair of electrodes but voltage is not applied between the pixel electrode and the common electrode, the liquid crystal molecules being aligned in a direction different from the alignment direction of the first display state, in a second display state in which voltage is applied between the pair of electrodes and voltage is applied between the pixel electrode and the common electrode.

19 Claims, 11 Drawing Sheets

(52) U.S. Cl.
CPC ...... *G02F 1/13306* (2013.01); *G02F 1/13439* (2013.01); *G02F 1/133345* (2013.01); *G02F 1/133528* (2013.01); *G02F 1/133784* (2013.01); *G02F 1/133788* (2013.01); *G02F 2001/13706* (2013.01); *G02F 2001/13712* (2013.01); *G02F 2001/133738* (2013.01); *G02F 2001/134372* (2013.01); *G02F 2001/134381* (2013.01); *G02F 2201/121* (2013.01); *G02F 2201/123* (2013.01); *G02F 2201/124* (2013.01)

(58) Field of Classification Search
CPC ........... G02F 1/133788; G02F 1/13439; G02F 1/1368; G02F 1/137; G02F 1/134363
See application file for complete search history.

(a)

(b)

(a)

(b)

(a)

(b)

(a)

(b)

(a)

(b)

(a)

(b)

(a)

(b)

(a)

(b)

LIQUID CRYSTAL DISPLAY DEVICE

TECHNICAL FIELD

The present invention relates to liquid crystal display devices. The present invention more specifically relates to liquid crystal display devices which are required to exhibit high speed response and a wide viewing angle.

BACKGROUND ART

The application range of liquid crystal display devices has been expanded to include applications such as aircrafts and automobiles, for example. Liquid crystal display devices are therefore required to have favorable display properties in various use environments. Here, important among the display properties are, for example, viewing angle characteristics and high speed response.

A widely used technique for achieving the wide viewing angle is the fringe field switching (FFS) mode. FIG. 10 illustrates schematic cross-sectional views of a conventional FFS mode liquid crystal display device in the states of (a) black display and (b) white display. The arrows illustrated in the state (b) in FIG. 10 indicate the direction of electric fields formed by voltage application. Hereinafter, the operation principle of the FFS mode is described with reference to FIG. 10. As illustrated in FIG. 10, an FFS mode liquid crystal display device has a basic structure in which a liquid crystal layer containing liquid crystal molecules 131 is provided between a pair of substrates 111 and 121, no electrode is formed on the substrate 111, and a thin-film transistor (TFT) 122, an insulating film 123, a common electrode 124, a dielectric layer 125, and a pixel electrode 126 are stacked in the given order on the substrate 121. The pixel electrode 126 is electrically connected to the TFT 122 via a contact hole 127.

In the FFS mode, the liquid crystal molecules 131 in the liquid crystal layer are aligned horizontally when no voltage is applied. Electric fields that are parallel to the TFT substrate (hereinafter, such electric fields are referred to as transverse electric fields) are generated by applying voltage between the common electrode 124 and the pixel electrode 126 which are provided to the TFT substrate. These electric fields rotate the alignment direction of each liquid crystal molecule 131. When no voltage is applied, the alignment direction of each liquid crystal molecule 131 is parallel or perpendicular to the axial directions of polarizing plates, so that black display is provided. When the liquid crystal molecules 131 are rotated by voltage application, the angle formed by the alignment direction of the liquid crystal molecules 131 and the axial direction of the polarizing plates is changed to produce gray or white display. The FFS mode providing display based on such an operation principle has an advantage of a wide viewing angle because this mode can control the display state while keeping the liquid crystal molecules 131 in a direction parallel to the substrates. When the state is switched from the voltage-on state to the voltage-off state, the alignment of the liquid crystal molecules 131 is not changed forcibly by the electric fields, but is returned to the original state as a result of reduction in the elastic energy. The FFS mode therefore has a disadvantage that the response speed becomes slow particularly at low temperatures where the viscosity of the liquid crystal is high.

The technique disclosed in Patent Literature 1 increases the response speed of liquid crystal display devices with transverse electric fields by disposing a pair of substrates that face each other and are each provided with a pair of electrodes, and applying voltage to the liquid crystal layer from both substrate sides.

Patent Literature 2, for example, discloses a technique of achieving high speed response which is called a super-fast response (SFR) mode. FIG. 11 illustrates schematic cross-sectional views of a conventional SFR mode liquid crystal display device in the states of (a) black display and (b) white display. The arrows illustrated in FIG. 11 indicate the directions of electric fields generated by voltage application. Hereinafter, the operation principle of the SFR mode is described with reference to FIG. 11. As illustrated in FIG. 11, an SFR mode liquid crystal display device has a basic structure in which a liquid crystal layer containing liquid crystal molecules 231 is provided between a pair of substrates 211 and 221, a first electrode 214 is stacked on the substrate 211, and TFTs 222, an insulating film 223, a second electrode 224, a dielectric layer 225, and a pair of drive electrodes 226 and 228 are stacked in the given order on the substrate 221. The drive electrodes 226 and 228 are electrically connected to the respective TFTs 222 via contact holes 227.

The SFR mode utilizes liquid crystal molecules having positive anisotropy of dielectric constant ($\Delta\in$), and the liquid crystal molecules in the liquid crystal layer are initially vertically aligned by the vertical alignment film. Electric fields are always present between the counter substrate and the TFT substrate, and these electric fields perpendicular to the liquid crystal layer (hereinafter, such electric fields are referred to as vertical electric fields) also control the alignment of the liquid crystal molecules to a direction perpendicular to the counter substrate and the TFT substrate. In this state, black display is provided. When voltage is applied between the electrodes of the TFT substrate, electric fields in the horizontal direction are generated in the liquid crystal layer. The vertical electric fields and the transverse electric fields, when combined, form strong electric fields, and the liquid crystal molecules respond at a high speed to be parallel to the strong electric fields. In this SFR mode, electric fields are always present in all the cases of providing black display, gray display, and white display, and the display state is changed by changing the directions of the electric fields. As a result, high speed response is achieved regardless of the gray scale levels.

CITATION LIST

Patent Literature

Patent Literature 1: JP 2010-66645 A
Patent Literature 2: WO 2012/128061

SUMMARY OF INVENTION

Technical Problem

The mode disclosed in Patent Literature 1 does not focus on the changes in the alignment of liquid crystal molecules in switching of the state from the voltage-on state to the voltage-off state. For this reason, the alignment of liquid crystal molecules is not changed forcibly by the electric fields but is returned to the original state as a result of reduction in the elastic energy as in the case of the typical conventional FFS mode. This technique therefore cannot sufficiently overcome the disadvantage that the response speed becomes slow at low temperatures where the viscosity of the liquid crystal is high.

Meanwhile, the SFR mode can achieve ultrahigh speed response even at low temperatures, but since this mode is based on the vertical alignment, the SFR mode is unfortunately inferior to a horizontal alignment mode such as the FFS mode in terms of the viewing angle characteristics.

The present invention was made in view of such a current state of the art, and aims to provide a liquid crystal display device in a new display mode that is based on the horizontal alignment capable of giving a wide viewing angle and that can achieve high speed response.

Solution to Problem

The inventors have made various studies on the method of achieving high speed response based on the horizontal alignment. The inventors then found that the alignment of liquid crystal molecules can be controlled using transverse electric fields not only in switching of display from white display to black display but also in switching of display from black display to white display, by providing a pair of substrates that face each other with a liquid crystal layer in between and that are each provided with a pair of electrodes, and differentiating the directions of the transverse electric fields generated by the two pairs of electrodes. The inventors found that the above disadvantages can be overcome as described above, and thereby made the present invention.

That is, a first aspect of the present invention may be a liquid crystal display device (hereinafter, also referred to as a first liquid crystal display device) including: a first substrate that includes a pair of electrodes; a second substrate that includes a switching element, a pixel electrode electrically connected to the switching element, and a common electrode; and a liquid crystal layer that is disposed between the first substrate and the second substrate and contains liquid crystal molecules aligned in parallel to the first substrate and the second substrate, at least one of the pair of electrodes including a first linear portion that extends in a first direction, at least one of the pixel electrode and the common electrode including a second linear portion that extends in a second direction intersecting the first direction, the liquid crystal molecules being aligned in a direction perpendicular or parallel to the first direction in a first display state in which voltage is applied between the pair of electrodes but voltage is not applied between the pixel electrode and the common electrode, the liquid crystal molecules being aligned in a direction different from the alignment direction of the first display state, in a second display state in which voltage is applied between the pair of electrodes and voltage is applied between the pixel electrode and the common electrode.

A second aspect of the present invention may be a liquid crystal display device (hereinafter, also referred to as a second liquid crystal display device) including: a first substrate that includes a pair of electrodes; a second substrate that includes a switching element, a pixel electrode electrically connected to the switching element, and a common electrode; and a liquid crystal layer that is disposed between the first substrate and the second substrate and contains liquid crystal molecules aligned in a direction parallel to the first substrate and the second substrate, the liquid crystal display device exhibiting different directions of a first electric field generated by the pair of electrodes and a second electric field generated by the pixel electrode and the common electrode in a projection of the electric fields on a surface parallel to the first substrate and the second substrate, the liquid crystal display device changing the strength of the second electric field while maintaining the strength of the first electric field so as to rotate the alignment direction of each liquid crystal molecule and thereby modulate display light.

Here, there is not a trade-off relation between the first aspect of the present invention and the second aspect of the present invention, and the first liquid crystal display device and the second liquid crystal display device may refer to the same liquid crystal display device.

Advantageous Effects of Invention

The first and second liquid crystal display devices can give high speed response while achieving a wide viewing angle which is an advantage of a horizontal alignment mode.

DESCRIPTION OF EMBODIMENTS

Embodiments of the present invention are described below with reference to drawings. The present invention is not limited to the following embodiments. The configurations of the respective embodiments may be appropriately combined or altered within the spirit of the present invention.

Embodiment 1

A liquid crystal display device of Embodiment 1 differs from conventional liquid crystal display devices in terms of the method for controlling the alignment of liquid crystal. Hence, the contents related to the display principle are mainly described below, and the components (e.g. backlight unit) common to conventional typical liquid crystal display devices with transverse electric fields are not described.

(1) General Configuration of Liquid Crystal Display Device

Figure 1:
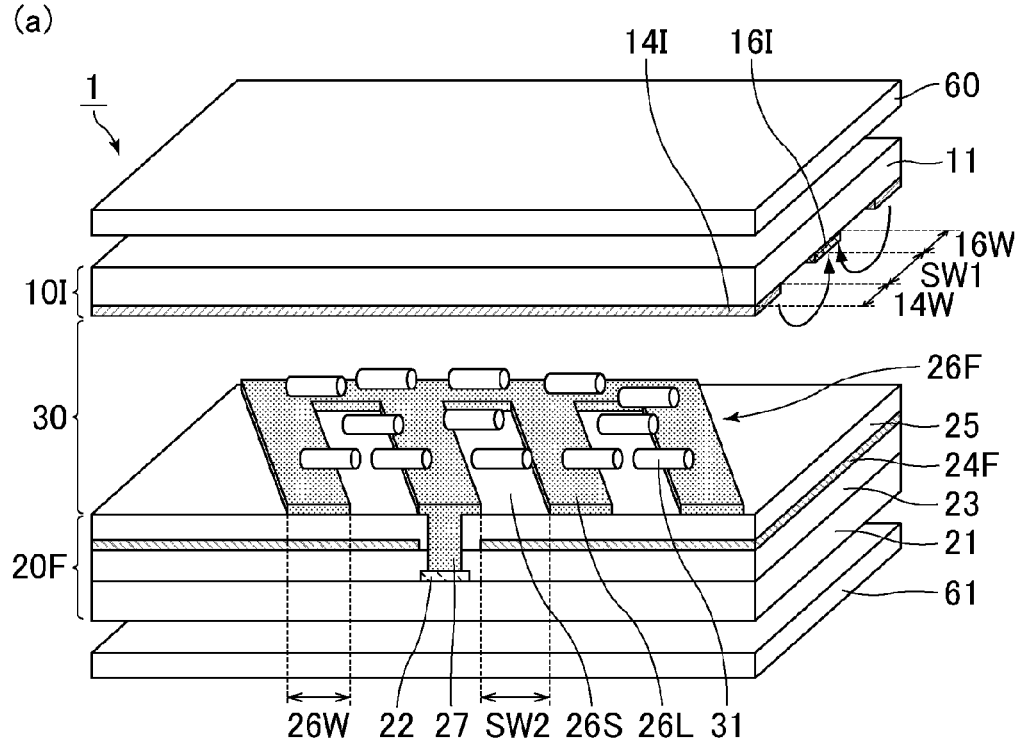
FIG. 1 illustrates perspective views of a liquid crystal display device of Embodiment 1 in the states of (a) black display and (b) white display.
Figure 1:
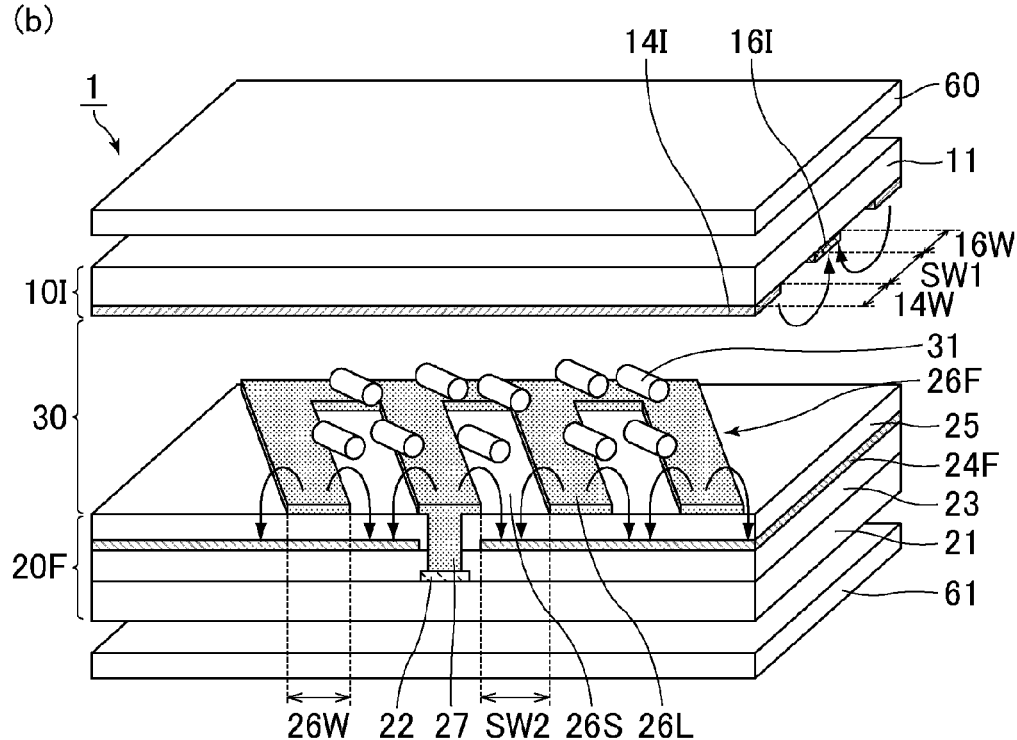
Figure 2:
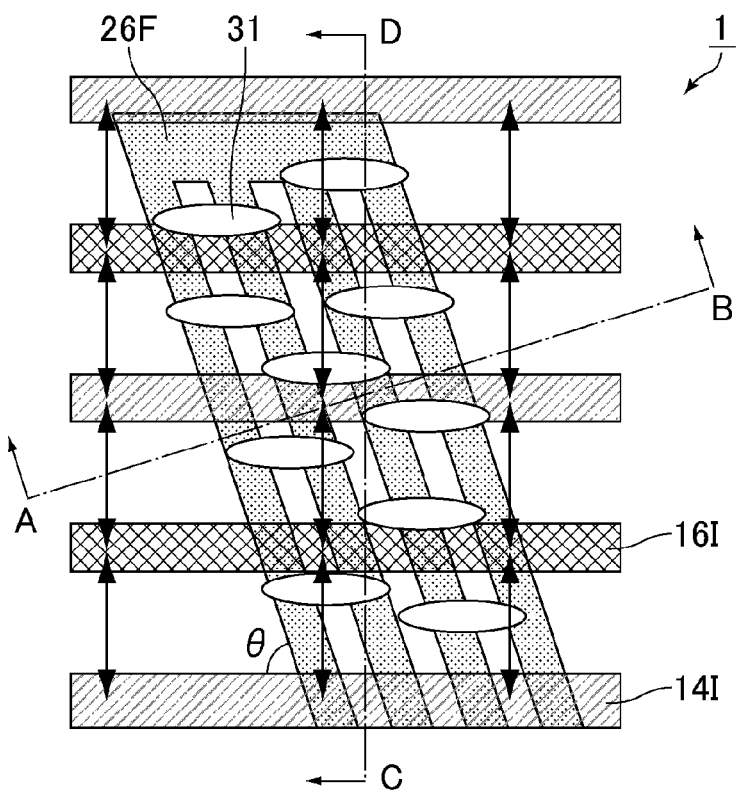
FIG. 2 illustrates schematic plan views of the liquid crystal display device of Embodiment 1 in the states of (a) black display and (b) white display.
Figure 2:
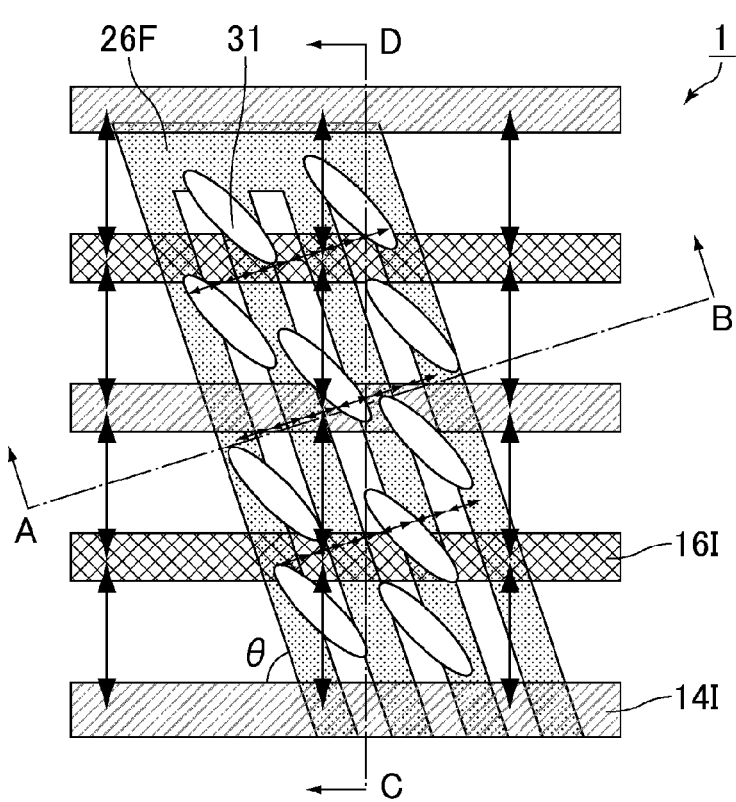
Figure 3:
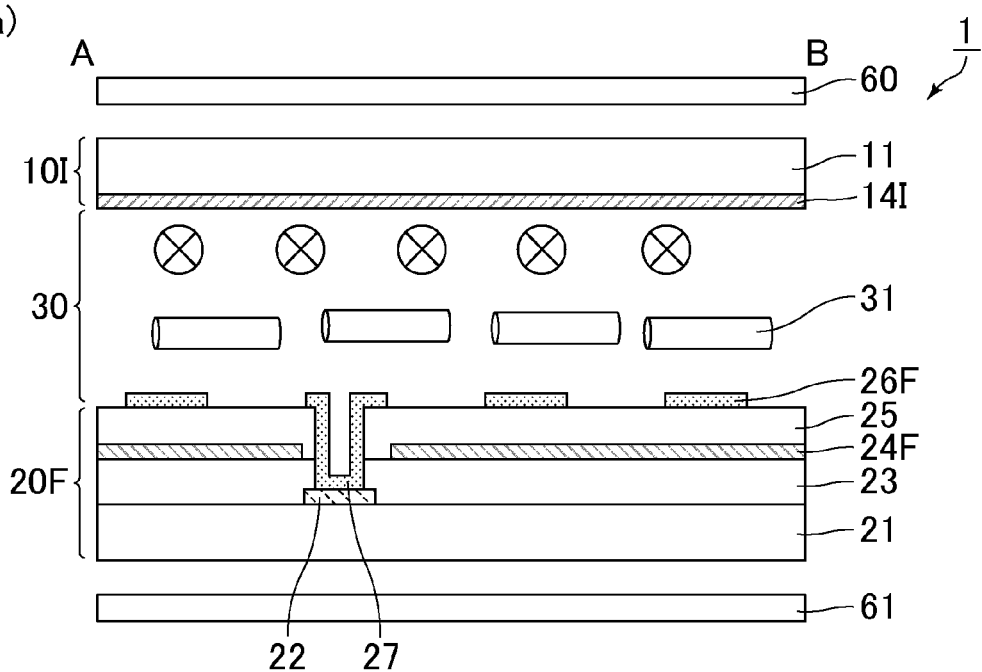
FIG. 3 illustrates schematic cross-sectional views taken along the A-B line in FIG. 2 in the states of (a) black display and (b) white display.
Figure 3:
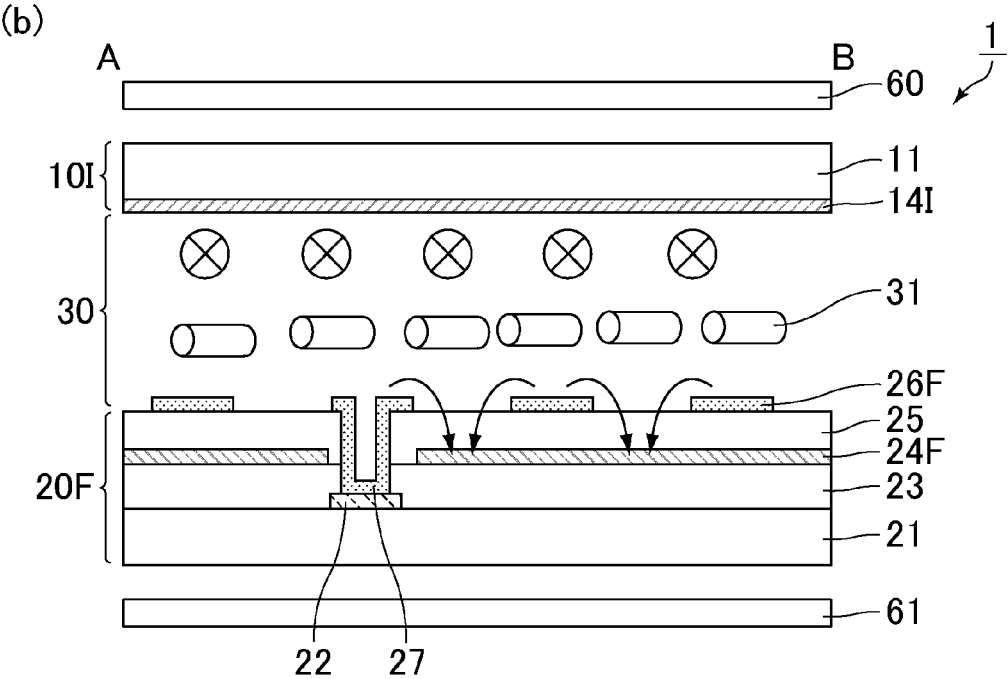
Figure 4:
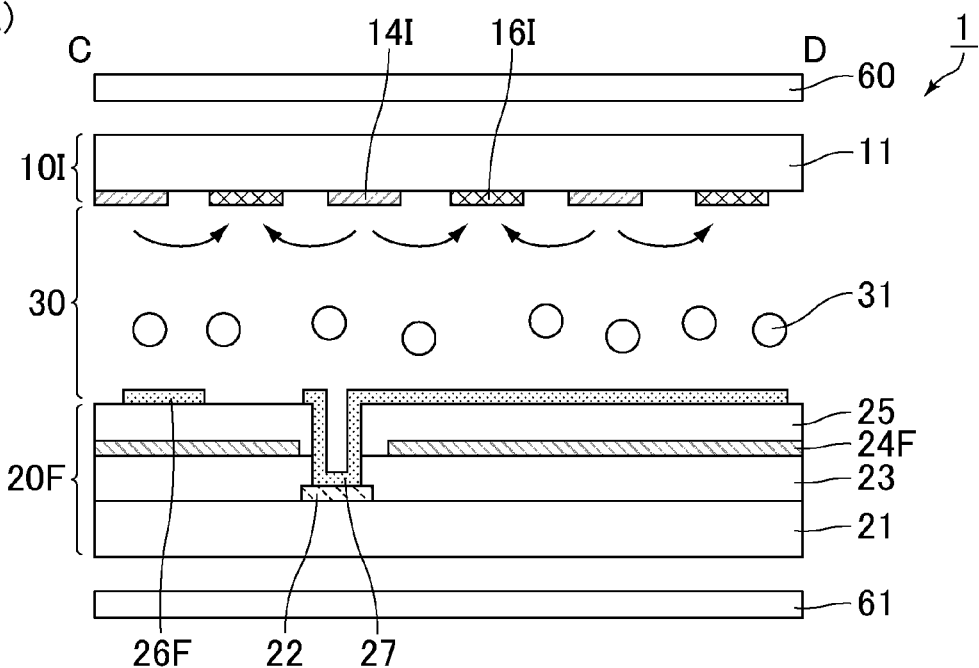
FIG. 4 illustrates schematic cross-sectional views taken along the C-D line in FIG. 2 in the states of (a) black display and (b) white display.
Figure 4:
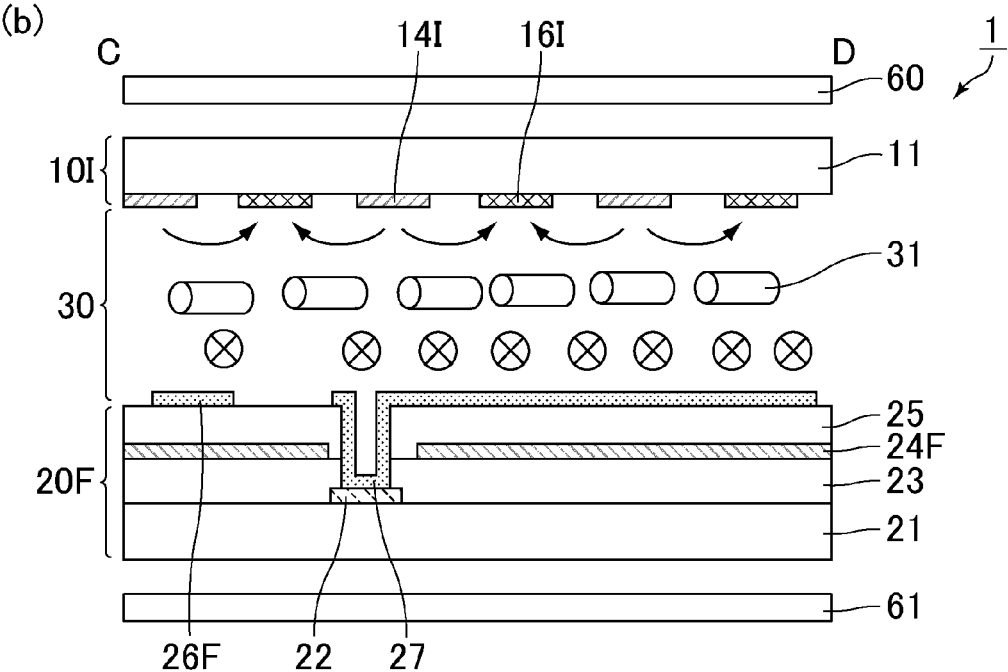

First, the general configuration of the liquid crystal display device of Embodiment 1 is described with reference to FIG. 1 to FIG. 4. FIG. 1 illustrates schematic perspective views of the liquid crystal display device of Embodiment 1. FIG. 2 illustrates schematic plan views of the liquid crystal display device of Embodiment 1. FIG. 3 illustrates schematic cross-sectional views taken along the A-B line in FIG. 2. FIG. 4 illustrates schematic cross-sectional views taken along the C-D line in FIG. 2. The states (a) in FIG. 1 to FIG. 4 each illustrate a black display state, and the states (b) in FIG. 1 to FIG. 4 each illustrate a white display state. The black display state is a state in which voltage is not applied to the pair of electrodes on the TFT substrate side. The white display state is a state in which voltage is applied to the pair of electrodes on the TFT substrate side. In both the black display state and the white display state, voltage is applied to the pair of electrodes on the counter substrate side, and thus electric fields parallel to the counter substrate are generated. The arrows illustrated in each drawing indicate the directions of the electric fields generated by voltage application. The circles with a cross inside (cf. the states (a) and (b) in FIG. 3, and the state (b) in FIG. 4) indicate that the directions of the electric fields are perpendicular to the paper surface.

A liquid crystal display device 1 of Embodiment 1 includes a liquid crystal layer 30 containing liquid crystal molecules 31 having negative anisotropy of dielectric constant ($\Delta \in$) between a counter substrate (first substrate) 10I and a TFT substrate (second substrate) 20F including a thin-film transistor (TFT) 22 as a switching element. The counter substrate 10I is disposed on the front side (display surface side) and the TFT substrate 20F is disposed on the back surface side. The initial alignment of the liquid crystal molecules 31 is set in a direction parallel to the counter substrate 10I and the TFT substrate 20F.

The counter substrate 10I has an in-plane switching (IPS) mode electrode structure on the liquid crystal layer 30 side of the substrate 11. In particular, a pair of comb-teeth electrodes whose comb teeth fit each other is provided. Hereinafter, one of the pair of comb-teeth electrodes is referred to as a first counter electrode 14I, and the other is referred to as a second counter electrode 16I. The first and second counter electrodes 14I and 16I each are provided with comb-teeth portions (first linear portions) parallel to each other, and the comb-teeth portions of these counter electrodes are alternately arranged at certain intervals (with certain spaces). When voltage is applied between the first and second counter electrodes 14I and 16I, electric fields parallel to the counter substrate 10I (i.e., transverse electric fields) are generated in the vicinities of the spaces in the liquid crystal layer 30.

In the IPS mode electrode structure provided to the counter substrate 10I, the width (electrode width) 14W or 16W of each tooth constituting the comb-teeth portion is preferably in the range of 3 µm to 10 µm, and is set to, for example, 4 µm. Also, the interval (electrode distance) SW1 between the comb teeth facing each other (the comb teeth of the first counter electrode 14I and the comb teeth of the second counter electrode 16I) is preferably in the range of 5 µm to 40 µm, and is set to, for example, 20 µm.

The TFT substrate 20F has the fringe field switching (FFS) mode electrode structure, and includes, specifically, a combination of a planar electrode and an electrode in which electrode slits are formed. Hereinafter, the planar electrode is referred to as a common electrode 24F, and the electrode in which electrode slits are formed is referred to as a pixel electrode 26F. The pixel electrode 26F has a structure in which electrode slits parallel to each other (portions with no electrode) are formed, and linear portions (second linear portions) 26L between electrode slits 26S are disposed at certain intervals.

In the FFS mode electrode structure provided to the TFT substrate 20F, the width (electrode width) 26W of each linear portion 26L is preferably in the range of 2 µm to 10 µm, and is set to, for example, 4 µm. The width (electrode distance) SW2 of each electrode slit 26S is preferably in the range of 3 µm to 8 µm, and is set to, for example, 4 µm.

The extension direction (first direction) of comb-teeth portions provided to the first and second counter electrodes 14I and 16I and the extension direction (second direction) of the linear portions 26L provided to the pixel electrode 26F are neither parallel nor perpendicular to each other, and are set to form a predetermined angle θ in the range of greater than 0° to smaller than 90°. The angle θ is preferably in the range of 60° to 85°, and is set to, for example, 75°.

The pixel electrode 26F is electrically connected to a drain electrode of the TFT 22 disposed below (substrate 21 side) via a contact hole (through hole) 27. As a lower layer of the pixel electrode 26F, a common electrode 24F is disposed with a dielectric layer (insulating film) 25 in between. The common electrode 24F is disposed on the entire surface of the substrate 21 with the insulating film 23 in between except for an opening for forming the contact hole 27. By applying voltage between the pixel electrode 26F and the common electrode 24F, electric fields (transverse electric fields or oblique electric fields) substantially parallel to the TFT substrate 20F are generated in the liquid crystal layer 30 in the vicinities of the electrode slits 26S.

A horizontal alignment film (not illustrated) is disposed on the outermost surface on the liquid crystal layer 30 side of each of the counter substrate 10I and the TFT substrate 20F so that at least the entire display region is covered. The horizontal alignment film may be any horizontal alignment film that aligns the liquid crystal molecules 31 in the liquid crystal layer 30 substantially in parallel with the surface of the film. The pre-tilt angle of the liquid crystal molecules 31 may be any angle in the range that gives the predetermined viewing angle characteristics, but an angle closer to 0° is more preferred. A suitable material of the horizontal alignment films is a photo-alignment film which exhibits alignment performance when irradiated with light (including ultraviolet light). A photo-alignment film can also give a pre-tilt angle of smaller than 1°. Here, a common alignment film which exhibits alignment performance by rubbing treatment may also be used. Such a common alignment film can also set the pre-tilt angle to about 1° to 2°.

The liquid crystal layer 30 contains the liquid crystal molecules 31 having negative anisotropy of dielectric constant ($\Delta \in$). Liquid crystal molecules having positive anisotropy of dielectric constant, in a white display state, may unintentionally be vertically aligned by the influence of the electric fields generated between the electrodes 14I and 16I provided to the counter substrate 10I and the electrodes 24F and 26F provided to the TFT substrate 20F, causing an alignment disorder. The liquid crystal molecules 31 having negative anisotropy of dielectric constant can surely prevent such an alignment disorder. This point will be described in detail again when the method for driving the liquid crystal display 1 is described.

The thickness of the liquid crystal layer 30 is preferably in the range of 2 μm to 5 μm, and is set to, for example, 3 μm.

Polarizing plates 60 and 61 are respectively disposed on the front surface side of the counter substrate 10I and the back surface side of the TFT substrate 20F. The absorption axes of the polarizing plates 60 and 61 are designed in the crossed Nicols. The absorption axis of one of the polarizing plates 60 and 61 is parallel to the comb-teeth portions provided to the first and second counter electrodes 14I and 16I (i.e. parallel to the first direction) while the absorption axis of the other of the polarizing plates 60 and 61 is perpendicular to the comb-teeth portions provided to the first and second counter electrodes 14I and 16I (i.e. perpendicular to the first direction).

An optical compensation film may be disposed between the counter substrate 10I and the polarizing plate 60 and between the TFT substrate 20F and the polarizing plate 61. The axial direction of the optical compensation film is preferably parallel to the comb-teeth portions provided to the first and second counter electrodes 14I and 16I (i.e. parallel to the first direction) from the viewpoint of optimization of optical compensation for the initial alignment state.

(2) Method for Driving Liquid Crystal Display Device

In the state where the liquid crystal display device is turned off, i.e., in the state where voltage is not applied to any of the first counter electrode 14I and the second counter electrode 16I in the counter substrate 10I and the pixel electrode 26F and the common electrode 24F in the TFT substrate 20F, the liquid crystal molecules 31 are aligned in parallel with the counter substrate 10I and the TFT substrate 20F. Here, the liquid crystal molecules 31 are controlled to be parallel (i.e. parallel to the first direction) or perpendicular (i.e. perpendicular to the first direction) to the comb-teeth portions provided to the first and second counter electrodes 14I and 16I by the horizontal alignment films.

In the state where the liquid crystal display device is turned on, alternating voltage is always applied between the first and second counter electrodes 14I and 16I provided to the counter substrate 10I regardless of the display state. The voltage application to the first and second counter electrodes 14I and 16I is therefore not required to be controlled by a driver, and thus an external power source can be utilized to apply a high voltage. In consideration of effects such as prevention of a short circuit between the first and second counter electrodes 14I and 16I provided to the counter substrate 10I, the electrode distance SW1 is preferably as wide as possible. Still, too wide an electrode distance may reduce the electric fields generated in the liquid crystal layer 30, which may lead to a failure in appropriate control of the alignment of the liquid crystal molecules 31. From the viewpoint of achieving both an increase in the electrode distance SW1 and the alignment control, the voltage applied to the first and second counter electrodes 14I and 16I is preferably in the range of 10 V to 100 V, and is set to, for example, 40 V.

FIGS. 1 to 4 each illustrate in the state (a) the initial alignment state (first display state). In this initial alignment state, voltage is applied between the first and second counter electrodes 14I and 16I and voltage is not applied between the pixel electrode 26F and the common electrode 24F. The electric fields generated between the first and second counter electrodes 14I and 16I align the liquid crystal molecules 31 having negative anisotropy of dielectric constant in a direction perpendicular to the electric fields. The long axes of the liquid crystal molecules 31 are set in a direction parallel to the comb-teeth portions of the first and second counter electrodes 14I and 16I (i.e. direction parallel to the first direction) by the effect of the horizontal alignment films, and are even more strongly set in this direction by the electric fields generated between the first and second counter electrodes 14I and 16I in the initial alignment state (first display state). That is, the first and second counter electrodes 14I and 16I have a function to force the liquid crystal molecules 31 to be in the alignment state provided by the horizontal alignment films. In the initial alignment, the liquid crystal molecules 31 are aligned to be parallel to one of the absorption axes 60 and 61 of the polarizing plates, so that black display is provided. As described above, the alignment direction provided by the horizontal alignment films and the alignment direction provided by the electric fields generated between the first and second counter electrodes 14I and 16I are made the same.

Voltage application to the pixel electrode 26F via the TFT 22 of the TFT substrate 20F switches the display to gray or black display (second display state). At this time, voltage application between the first and second counter electrodes 14I and 16I is maintained. FIGS. 1 to 4 each illustrate in the state (b) a state where voltage is applied between the first and second counter electrodes 14I and 16I and voltage is applied between the pixel electrode 26F and the common electrode 24F. In the initial alignment state, the liquid crystal molecules 31 are aligned in a direction perpendicular to the initial electric fields (first electric fields) from the counter substrate 10I. When electric fields for driving (second electric fields) are generated from the TFT substrate 20F, the liquid crystal molecules 31 are rotated to be in a direction perpendicular to the electric fields for driving (i.e. in a direction parallel to the second direction). That is, since the directions of the first electric fields and the second electric fields in a projection on a surface parallel to the counter substrate 10I and the TFT substrate 20F are different, the alignment direction of the liquid crystal molecules 31 in a projection on the surface is rotated when the intensity of the second electric fields is changed while the intensity of the first electric fields is kept at a certain level. Accordingly, the alignment of the rotated liquid crystal molecules 31 is not parallel to any of the absorption axes of the pair of polarizing plates 60 and 61 set in the crossed Nicols any more, whereby the light (display light) passing through the liquid crystal layer 30 is modulated between the first display state and the second display state. Thereby, gray display or white display is provided.

The angle of rotation of the liquid crystal molecules 31 changes depending on factors such as: (1) the angle θ formed by the comb-teeth portions provided to the first and second counter electrodes 14I and 16I and the linear portions 26L provided to the pixel electrode 26F; (2) voltage between the first and second counter electrodes 14I and 16I; (3) voltage between the pixel electrode 26F and the common electrode 24F; (4) the electrode widths 14W and 16W of the respective first and second counter electrodes 14I and 16I, and the electrode distance SW1 therebetween; (5) the electrode width 26W and the electrode distance SW2 in the pixel electrode 26F; (6) the value of the anisotropy of dielectric constant of the liquid crystal molecules 31; and (7) the thickness of the liquid crystal layer 30. The application voltage between the pixel electrode 26F and the common electrode 24F in white display is preferably in the range of 5 V to 7 V, and is set to, for example, 6.5 V. The application voltage depends on the rated voltage of the driver to be used, and may basically be as high as possible.

The above driving method employs horizontal alignment, and thus can achieve a wide viewing angle. Also, the driving method described above can achieve high speed response since there is an alignment control force of electric fields both in switching from black display to gray or white display and in switching from gray or white display to black display. That is, the alignment direction of the liquid crystal molecules 31 is forcibly controlled by the electric fields from the counter substrate 10I in black display, and also in the gray or white display, the alignment of the liquid crystal molecules 31 is controlled by combined electric fields of the electric fields from the counter substrate 10I and the electric fields from the TFT substrate 20F which are always present. Therefore, the alignment of the liquid crystal molecules 31 is always forcibly controlled by electric fields. Also, since a high voltage can be applied to the electrodes 14I and 16I on the counter substrate 10I side by an external power source, the control force is strengthened and thus the response speed can be further increased. If the application voltage to the electrodes 14I and 16I on the counter substrate 10I side is made too high, the control force for the liquid crystal molecules 31 may be too strong, deteriorating the response property of the liquid crystal molecules 31 when voltage is applied to the electrodes 24F and 26F on the TFT substrate 20F side. Meanwhile, from the viewpoint of prevention of a short circuit, the electrodes 14I and 16I are preferably disposed as far apart as possible from each other. Hence, by setting the electrode distance SW1 to as wide as about 20 μm and the application voltage to the electrodes 14I and 16I to as high as 40 V, an appropriate control force can be achieved and a short circuit can be sufficiently prevented. Here, since the application voltage to the electrodes 14I and 16I on the counter substrate 10I side is high, the electrode distance SW1 on the counter substrate 10I side is preferably wider than the distance between the electrodes 24F and 26F on the TFT substrate 20F side.

Although not illustrated in the state (b) of FIG. 4, electric fields are present between the electrodes 14I and 16I on the counter substrate 10I side and the electrodes 24F and 26F on the TFT substrate 20F side. However, since the present embodiment employs the liquid crystal molecules 31 having negative anisotropy of dielectric constant, electric fields perpendicular to the substrates 10I and 20F are generated in a direction perpendicular to the longitudinal directions of the liquid crystal molecules 31 and the influence on the liquid crystal molecules 31 is small. That is, the liquid crystal molecules 31 having negative anisotropy of dielectric constant can be stably maintained in the horizontal direction. Accordingly, alignment disorder can be prevented, and a wide viewing angle can be achieved.

Also, when the absorption axes of the polarizing plates 60 and 61 are set in the parallel Nicols and the absorption axis of one of the polarizing plates 60 and 61 is disposed in parallel with the comb-teeth portions provided to the first and second counter electrodes 14I and 16I, the initial alignment state can also be white display.

Embodiment 2

A liquid crystal display device of Embodiment 2 has the same configuration as that of Embodiment 1 except that liquid crystal molecules having positive anisotropy of dielectric constant are used in place of the liquid crystal molecules having negative anisotropy of dielectric constant.

As described above, liquid crystal molecules having positive anisotropy of dielectric constant are considered to easily cause alignment disorder, but are advantageous in that there are various kinds of liquid crystal molecules so that liquid crystal molecules suited to the desired conditions can be selected. Accordingly, liquid crystal molecules with excellent temperature characteristics such as a high viscosity at low temperatures, and liquid crystal molecules having a large value for the anisotropy of dielectric constant can be used. For example, liquid crystal molecules having negative anisotropy of dielectric constant exhibit $|\Delta\in|$=about 5, while liquid crystal molecules having positive anisotropy of dielectric constant exhibit $|\Delta\in|$=about 20. Here, in the case that the anisotropy of dielectric constant is negative, the absolute value of the anisotropy of dielectric constant is preferably 3 to 7, and is set to, for example, about 4. In the case that the anisotropy of dielectric constant is positive, the absolute value of the anisotropy of dielectric constant is preferably about 5 to 20, and is set to, for example, about 7. The absolute value of the anisotropy of dielectric constant is preferably large to simply set the drive voltage as low as possible. Still, if the absolute value is too large, the reliability of the liquid crystal material is generally low.

Figure 5:
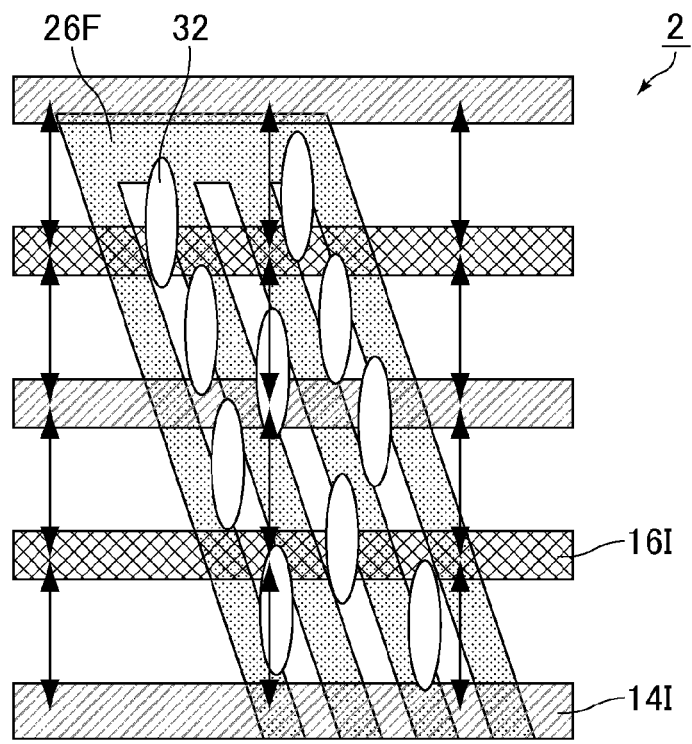
FIG. 5 illustrates schematic plan views of a liquid crystal display device of Embodiment 2 in the states of (a) black display and (b) white display.
Figure 5:
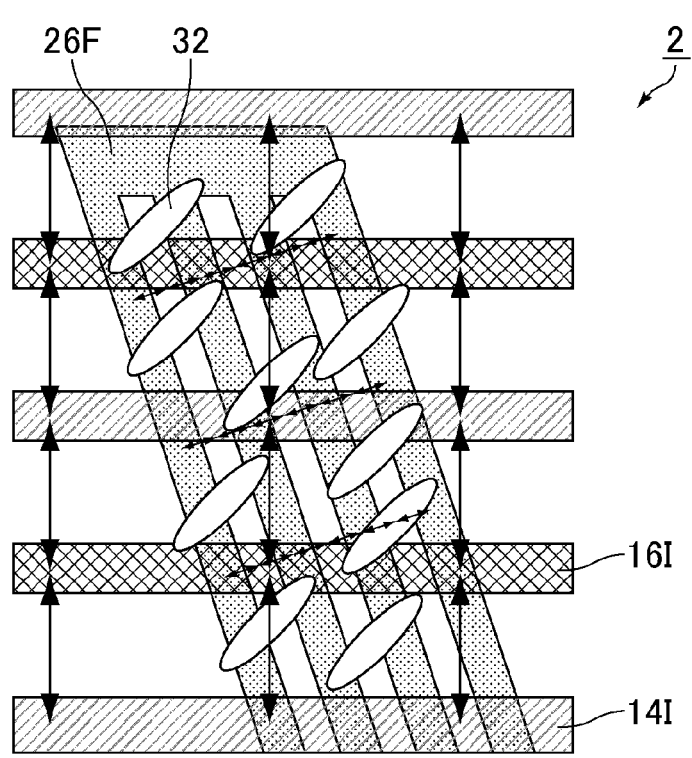

FIG. 5 illustrates schematic plan views of a liquid crystal display device of Embodiment 2 in the states of (a) black display and (b) white display. The alignment of liquid crystal molecules 32 having positive anisotropy of dielectric constant illustrated in FIG. 5, when compared with the alignment of the liquid crystal molecules 31 having negative anisotropy of dielectric constant illustrated in FIG. 2 (Embodiment 1), is rotated by 90° in consideration that the conditions for forming the electric fields are the same and the natures of the anisotropy of dielectric constants are different. That is, in the initial white display (first display state), the alignment is in a direction perpendicular to the comb-teeth portions of the first and second counter electrodes 14I and 16I (i.e. direction perpendicular to the first direction), while in the gray or black display (second display state), the alignment is rotated to be in a direction parallel to the electric fields for driving (i.e. direction perpendicular to the second direction). Such a liquid crystal display device 2 of Embodiment 2 can also give high speed response while achieving a wide viewing angle which is an advantage of a horizontal alignment mode.

Here, some of the factors having an influence on the alignment control of the liquid crystal molecules 31 except for the factor (6) the value of the anisotropy of dielectric constant of the liquid crystal molecules 32, namely the following factors, may be the same as in Embodiment 1: (1) the angle formed by the comb-teeth portions provided to the first and second counter electrodes 14I and 16I and the linear portions 26L provided to the pixel electrode 26F; (2) voltage between the first and second counter electrodes 14I and 16I; (3) voltage between the pixel electrode 26F and the common electrode 24F; (4) the electrode widths of the respective first and second counter electrodes 14I and 16I, and the arrangement distance; (5) the electrode width 26W and the electrode distance SW2 in the pixel electrode 26F; and (7) the thickness of the liquid crystal layer 30. In the case that the anisotropy of dielectric constant is positive, there is a wide variety of choice of the liquid crystal molecules 31 for use. Hence, the electrode distances SW1 and SW2 and the thickness of the liquid crystal layer 30 can be further widened.

Embodiment 3

A liquid crystal display device of Embodiment 3 has the same configuration as that of Embodiment 1 except that the electrode structure of the TFT substrate is changed from the FFS mode electrode structure to the IPS mode electrode structure. Providing the IPS mode electrode structure to the TFT substrate enables reduction of the number of layers constituting the TFT substrate, thereby reducing the number of steps required for formation of layers and patterning.

Figure 6:
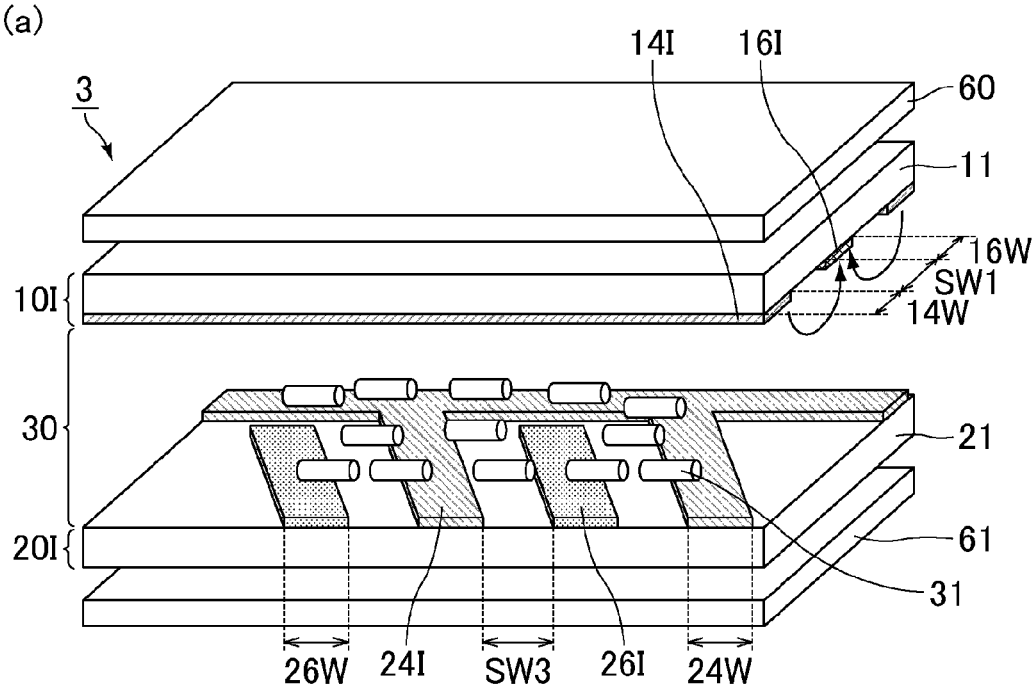
FIG. 6 illustrates perspective views of a liquid crystal display device of Embodiment 3 in the states of (a) black display and (b) white display.
Figure 6:
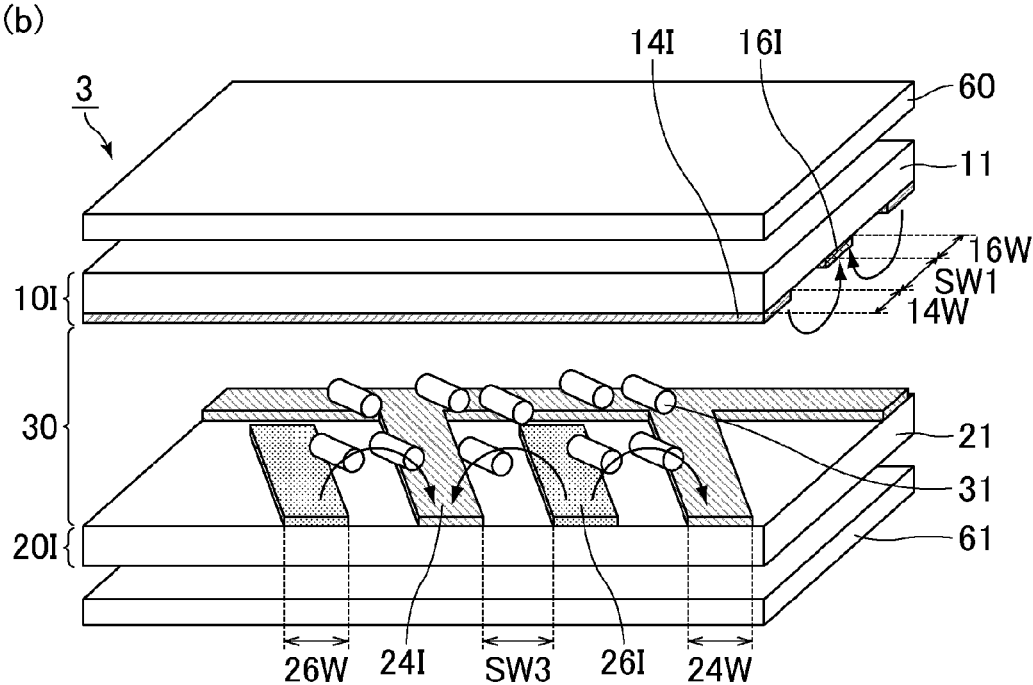

FIG. 6 illustrates perspective views of a liquid crystal display device of Embodiment 3 in the states of (a) black display and (b) white display. In FIG. 6, components such as TFTs are not illustrated on the TFT substrate 201. As illustrated in FIG. 6, in the liquid crystal display device of Embodiment 3, both the counter substrate 10I and the TFT substrate 20I have the IPS mode electrode structure. Such a liquid crystal display device 3 of Embodiment 3 can also give high speed response while achieving a wide viewing angle which is an advantage of the horizontal alignment mode.

Here, some of the factors having an influence on the alignment control of the liquid crystal molecules 31, namely the following factors, may be the same as in Embodiment 1: (2) voltage between the first and second counter electrodes 14I and 16I; (3) voltage between pixel electrode 26I and common electrode 24I; (4) the electrode widths 14W and 16W of the respective first and second counter electrodes 14I and 16I, and the electrode distance SW1 therebetween; (6) the value of the anisotropy of dielectric constant of the liquid crystal molecules 31; and (7) the thickness of the liquid crystal layer 30.

In the case of using the IPS mode electrode structure on the counter substrate 10I, a short circuit is more likely to occur between the electrodes than in the FFS mode electrode structure. Meanwhile, voltage can be applied to the counter substrate 10I by an independent power source, which means that a relatively high voltage can be applied. For this reason, the electrode widths 14W and 16W of the respective first and second counter electrodes 14I and 16I each are preferably in the range of 3 µm to 10 µm, most preferably 4 µm. The electrode distance SW1 between the first and second counter electrodes 14I and 16I is preferably in the range of 5 µm to 40 µm, most preferably 20 µm.

The angle formed by the comb-teeth portions of the first and second counter electrodes 14I and 16I and the comb-teeth portions of the pixel electrode 26I and the common electrode 24I is set to a predetermined angle in the range of greater than 0° to smaller than 90°. Preferably, the angle is in the range of 60° to 85°, and is set to, for example, 75°.

In the IPS mode electrode structure of the pixel electrode 26I and the common electrode 24I provided to the TFT substrate 20I, the width (electrode width) 24W or 26W of a tooth constituting the comb-teeth portions is preferably in the range of 3 µm to 5 µm, and is set to, for example, 4 µm. Also, the interval (electrode distance) SW3 between the comb teeth facing each other (the comb teeth of the pixel electrodes 26I and the comb teeth of the common electrode 24I) is preferably in the range of 5 µm to 15 µm, and is set to, for example, 8 µm.

Also, the configuration of the present embodiment may be changed such that liquid crystal molecules having positive anisotropy of dielectric constant are used in place of the liquid crystal molecules 31 having negative anisotropy of dielectric constant.

Embodiment 4

A liquid crystal display device of Embodiment 4 has the same configuration as that of Embodiment 1 except that the electrode structure of the counter substrate is changed from the IPS mode electrode structure to the FFS mode electrode structure. In the case that the counter substrate has the FFS mode electrode structure, the probability of occurrence of a short circuit between a pair of electrodes provided to the counter substrate can be lowered. Also, provision of a planar electrode enables prevention of the influence of static electricity from the exterior of the display device.

Figure 7:
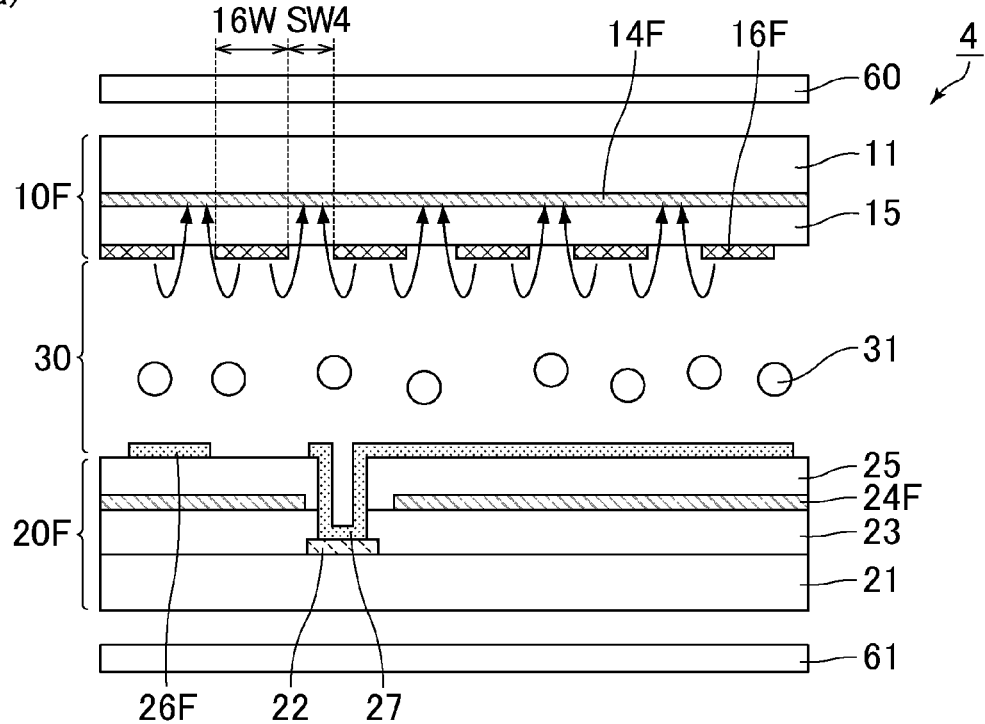
FIG. 7 illustrates schematic cross-sectional views of a liquid crystal display device of Embodiment 4 in the states of (a) black display and (b) white display.
Figure 7:
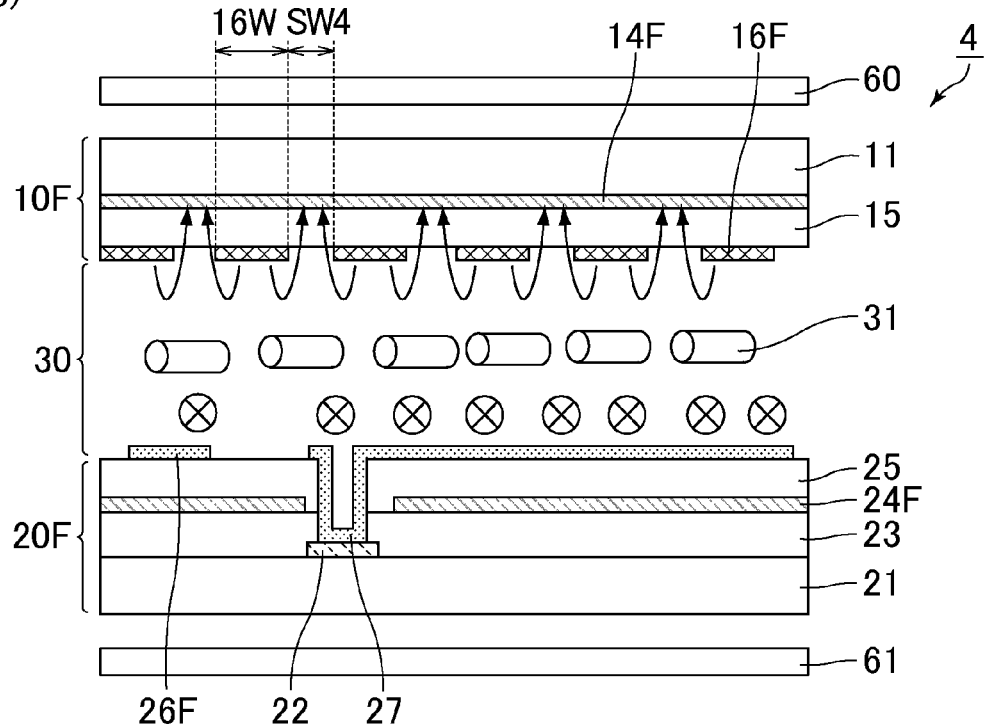

FIG. 7 illustrates schematic cross-sectional views of a liquid crystal display device of Embodiment 4 in the states of (a) black display and (b) white display. As illustrated in FIG. 7, in a liquid crystal display device 4 of Embodiment 4, the FFS mode electrode structure is provided not only to the TFT substrate 20F but also to a counter substrate 10F. Specifically, a planar first counter electrode 14F and a second counter electrode 16F in which parallel electrode slits (no electrode portions) are formed are stacked on the counter substrate 10F via the dielectric layer 15. Such a liquid crystal display device 4 of Embodiment 4 can also give high speed response while achieving a wide viewing angle which is an advantage of a horizontal alignment mode.

Here, some of the factors having an influence on the alignment control of the liquid crystal molecules 31, namely the following factors, may be the same as in Embodiment 1: (2) voltage between the first and second counter electrodes 14F and 16F; (3) voltage between the pixel electrode 26F and the common electrode 24F; (5) the electrode width and the electrode distance in the pixel electrode 26F; (6) the value of the anisotropy of dielectric constant of the liquid crystal molecules 31; and (7) the thickness of the liquid crystal layer 30. Here, since the electrode structure of the counter substrate 10F is of the FFS mode, an electrode distance SW4 in the second counter electrode 16F can be narrowed to about 5 µm. Also, the suitable electrode width 16W in the electrode 16F is in the range of about 3 µm to about 7 µm.

The angle formed by the linear portions provided to the first or second counter electrode 14F or 16F and the linear portions 26L provided to the pixel electrode 26F is set to a predetermined angle in the range of greater than 0° to smaller than 90°. Preferably, the angle is in the range of 60° to 85°, and is set to, for example, 75°.

In the FFS mode electrode structure of the first and second counter electrodes 14F and 16F, the electrode width 16W in the electrode 16F is preferably in the range of 3 µm to 7 µm, and is set to, for example, 5 µm. Also, the electrode distance SW4 in the electrode 16F is preferably in the range of 3 µm to 7 µm, and is set to, for example, 5 µm.

The configuration in the present embodiment may be changed such that liquid crystal molecules having positive anisotropy of dielectric constant are used in place of the liquid crystal molecules 31 having negative anisotropy of dielectric constant.

Embodiment 5

A liquid crystal display device of Embodiment 5 is the same as that of Embodiment 1 except that the electrode structure of the counter substrate is changed from the IPS mode electrode structure to the FFS mode electrode structure and that the electrode structure of the TFT substrate is changed from the FFS mode electrode structure to the IPS mode electrode structure.

Figure 8:
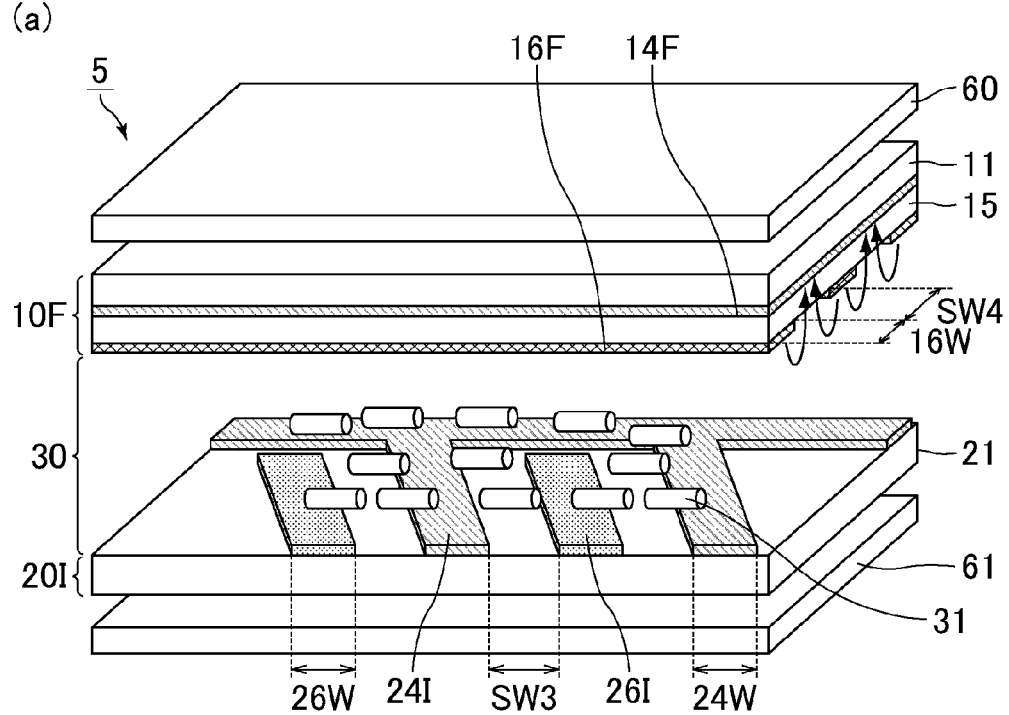
FIG. 8 illustrates perspective views of a liquid crystal display device of Embodiment 5 in the states of (a) black display and (b) white display.
Figure 8:
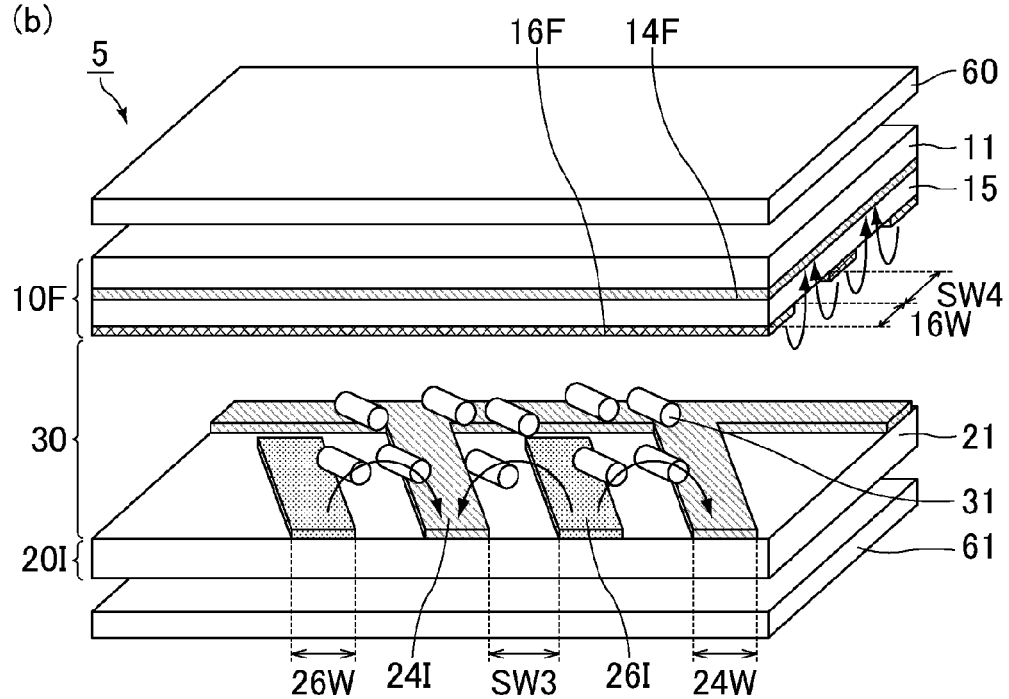

FIG. 8 illustrates perspective views of a liquid crystal display device of Embodiment 5 in the states of (a) black display and (b) white display. In FIG. 8, components such as TFTs of the TFT substrate 20I are not illustrated. As illustrated in FIG. 8, in a liquid crystal display device 5 of Embodiment 5, the counter substrate 10F has the FFS mode electrode structure and the TFT substrate 20I has the IPS mode electrode structure. Such a liquid crystal display device 5 of Embodiment 5 can also give high speed response while achieving a wide viewing angle which is an advantage of a horizontal alignment mode.

Here, some of the factors having an influence on the alignment control of the liquid crystal molecules 31, namely the following factors, may be the same as in Embodiment 1: (2) voltage between the first and second counter electrodes 14F and 16F; (3) voltage between the pixel electrode 26I and the common electrode 24I; (6) the value of the anisotropy of dielectric constant of the liquid crystal molecules 31; and (7) the thickness of the liquid crystal layer 30. The configuration in the present embodiment may be changed such that liquid crystal molecules having positive anisotropy of dielectric constant are used in place of the liquid crystal molecules 31 having negative anisotropy of dielectric constant.

The angle formed by the linear portions provided to the first or second counter electrode 14F or 16F and the comb-teeth portions provided to the pixel electrode 26I and the common electrode 24I is set to a predetermined angle in the range of greater than 0° to smaller than 90°. Preferably, the angle is in the range of 60° to 85°, and is set to, for example, 75°.

In the FFS mode electrode structure of the first and second counter electrodes 14F and 16F, the electrode width 16W in the electrode 16F is preferably in the range of 3 µm to 7 µm, and is set to, for example, 5 µm. Also, the electrode distance SW4 in the electrode 16F is preferably in the range of 3 µm to 7 µm, and is set to, for example, 5 µm.

In the IPS mode electrode structure of the pixel electrode 26I and the common electrode 24I, the width (electrode width) 24W or 26W of each tooth constituting the comb-teeth portions is preferably in the range of 3 µm to 5 µm, and is set to, for example, 4 µm. Also, the interval (electrode distance) SW3 between the comb teeth facing each other (the comb teeth of the pixel electrode 26I and the comb teeth of the common electrode 24I) is preferably in the range of 5 µm to 10 µm, and is set to, for example, 8 µm.

The configuration in the present embodiment may be changed such that liquid crystal molecules having positive anisotropy of dielectric constant are used in place of the liquid crystal molecules 31 having negative anisotropy of dielectric constant.

Example 1

Figure 9:
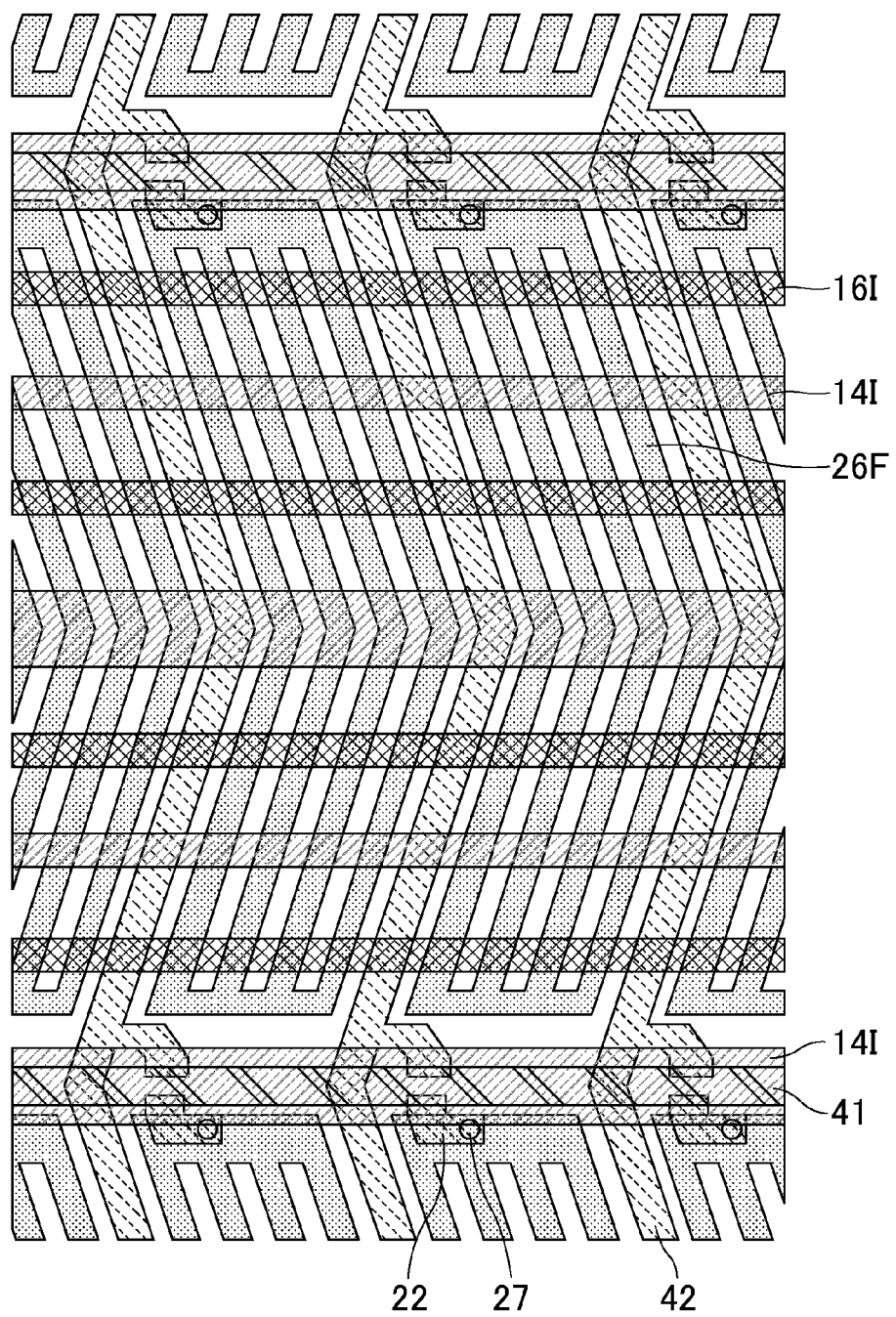
FIG. 9 illustrates a schematic plan view of a liquid crystal display device of Example 1.
Figure 10:
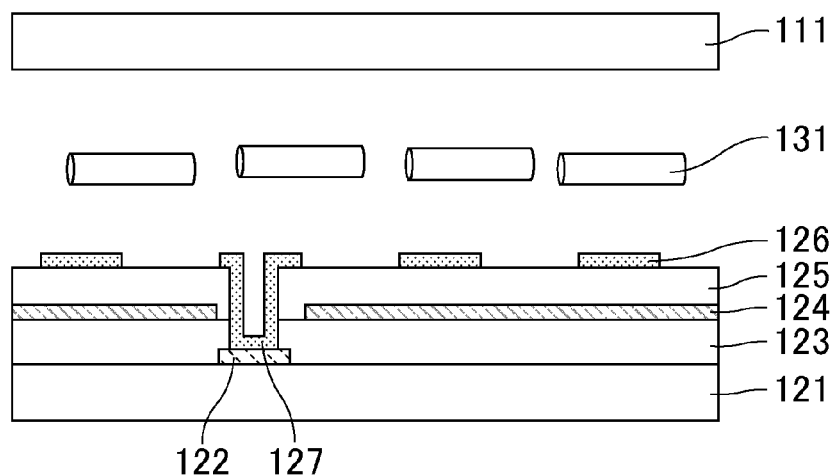
FIG. 10 illustrates schematic cross-sectional views of a conventional FFS mode liquid crystal display device in the states of (a) black display and (b) white display.
Figure 10:
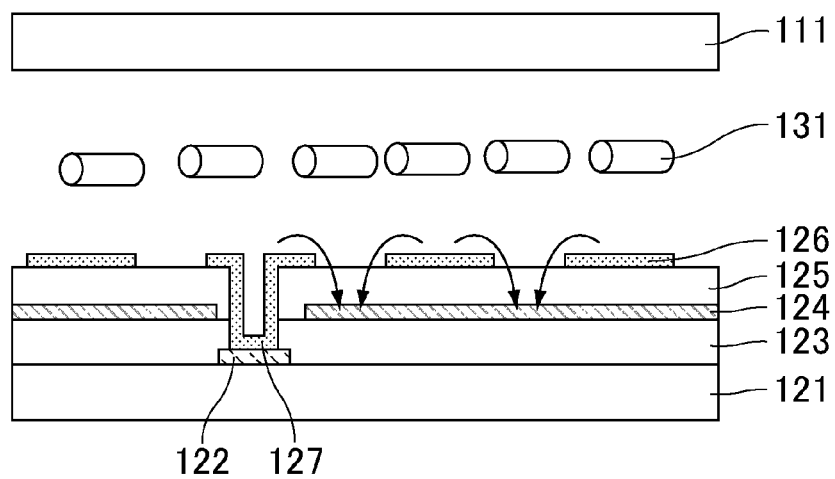
Figure 11:
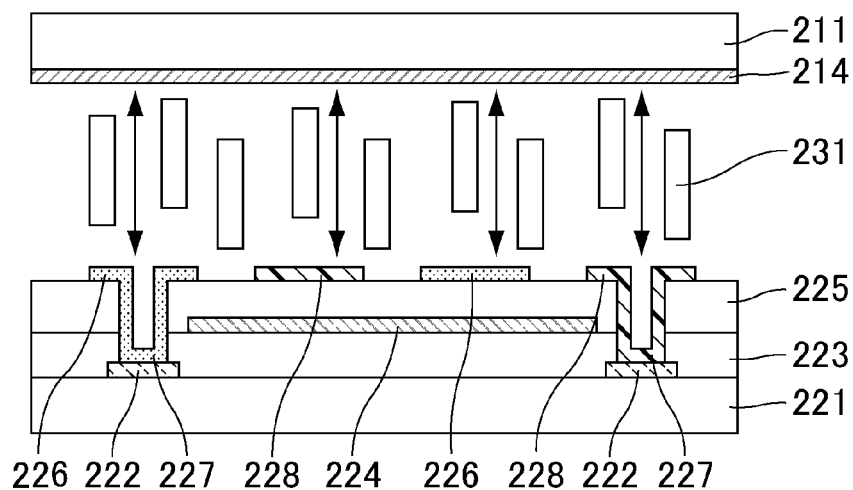
FIG. 11 illustrates schematic cross-sectional views of a conventional SFR mode liquid crystal display device in the states of (a) black display and (b) white display.
Figure 11:
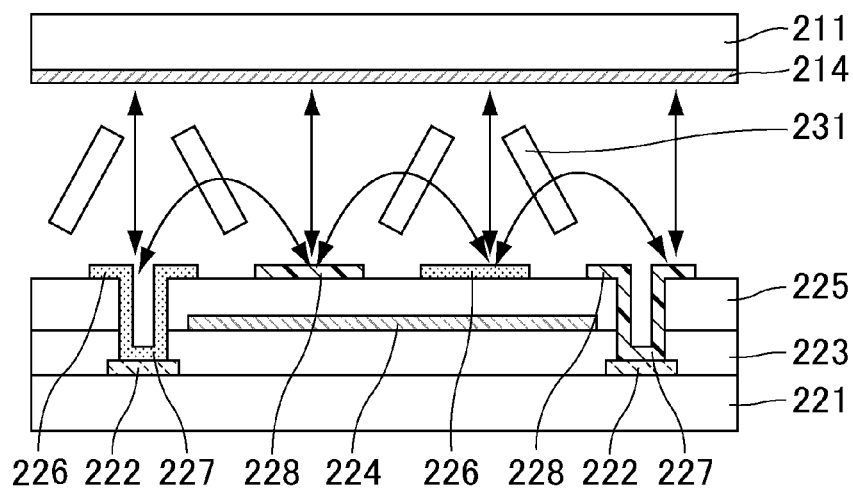

A liquid crystal display device produced based on the configuration of Embodiment 1 is described with reference to FIG. 9. FIG. 9 illustrates a schematic plan view of a liquid crystal display device of Example 1. Although FIG. 9 illustrates an enlarged view of V-shaped two pixels which bend at the center and parts of the adjacent pixels, many pixels of the shape illustrated in FIG. 9 are periodically arranged in the entire display region in the liquid crystal display device of Example 1. One pixel in FIG. 9 corresponds to one of red (R), green (G), and blue (B) pixels.

The liquid crystal display device of Example 1 was produced by the following method. Since the components other than the TFT substrate and the counter substrate used were conventionally known ones, those components are not described below.

(Method for Producing TFT Substrate)

First, after scanning lines 41 (gate electrodes of the TFTs 22) were formed, an interlayer insulating film made of silicon nitride (SiN) and semiconductor layers made of amorphous silicon (a-Si) were formed in the given order. The semiconductor layers may be layers containing indium-gallium-zinc-oxygen (In—Ga—Zn—O) oxide semiconductors. Subsequently, signal lines 42 and source electrodes and drain electrodes of the TFTs were simultaneously formed by patterning a conductive film. Then, an organic insulating film with a thickness of several microns was formed. A transparent common electrode was formed thereon. Here, the common electrode was patterned to have openings such that the drain electrodes of the TFTs 22 and the pixel electrodes 26F would be able to be electrically connected to each other. A dielectric layer made of SiN was formed, and the contact holes 27 were formed for connection with the drain electrodes of the TFTs 22. Then, the pixel electrodes 26F to which electric signals from the drain electrodes of the TFTs 22 are supplied through the contact holes 27 were formed. The pixel electrodes 26F were bent within the pixels so that the viewing angle characteristics were improved. These configurations are basically the same as those of conventional FFS mode liquid crystal display devices.

(Production Method of Counter Substrate)

The first and second counter electrodes 14I and 16I each were formed to have a shape of comb teeth. The first and second counter electrodes 14I and 16I were formed in the same layer and to be adjacent to the liquid crystal layer only with a horizontal alignment film in between. Also, in order to cause the electric fields generated between the first and second counter electrodes 14I and 16I to be more horizontal, the distance between the electrodes 14I and 16I was made to be 20 µm or wider. The present example allowed the distance between the electrodes 14I and 16I to be wide by applying alternating voltage (AC voltage) as high as 40 to 50 V between the first and second counter electrodes 14I and 16I using an external power source as described below. Here, the application voltage and the frequency of the alternating voltage need not to be changed frequently, and voltage with a fixed waveform can be applied. For this reason, a special driver produced by a semiconductor process is not necessary. For example, voltage conversion may be performed with a coil to enable application of high alternating voltage. The voltage is preferably set to 100 V or lower because if the voltage is too high, discharge and dielectric breakdown may occur. Here, fixed voltage of about 40 to 50 V was applied.

(Drive Method of Liquid Crystal Display Device)

The electric potential of the electrode on the lower electric potential side of each of the first and second counter electrodes 14I and 16I was basically the same as the electric potential of the common electrode provided to the TFT substrate. The electric potential of the electrode on the lower electric potential side of each of the first and second counter electrodes 14I and 16I may be different from the electric potential of the common electrode provided to the TFT substrate. An alternating voltage of 40 V to 50 V was applied between the first and second counter electrodes 14I and 16I, using an external power source. To the pixel electrodes 26F was applied an alternating voltage of 6 V at the maximum (voltage in the white display state).

In the present example, the driving frequency of the first and second counter electrodes 14I and 16I provided to the counter substrate and the driving frequency of the pixel electrodes 26F and the common electrode were significantly differentiated. Generally, the driving frequency on the TFT substrate side is in the range of 60 Hz to 120 Hz. In contrast, the driving frequency on the counter substrate side was set to about 10 Hz or 300 Hz. In the case that the driving frequency was set to 10 Hz, the power consumption was small, but flickers were observed. In the case that the driving frequency was set to 300 Hz, flickers were not observed, but the power consumption was large. In the case of differentiating the driving frequency on the counter substrate side and the driving frequency on the TFT substrate side as described above, the timing to apply voltage to the counter substrate side and the timing to apply voltage to the TFT substrate side are not necessarily matched. Meanwhile, in the case of setting the driving frequency on the counter substrate side and the driving frequency on the TFT substrate side to the same frequency, the timing to apply voltage to the counter substrate side and the timing to apply voltage to the TFT substrate side are important. In order to match the timing, positive polarity voltage is applied to the counter electrode side when positive polarity voltage is applied to the TFT substrate side, while negative polarity voltage is applied to the counter substrate when negative polarity voltage is applied to the TFT substrate side. In this case, horizontal line-reversal driving was used on the TFT substrate side, and the electrodes on the counter substrate side were provided to form thin strips with a width corresponding to the pixel electrodes 26F on the TFT substrate side. These thin strip electrodes were further processed to have an electrode pattern of several microns in width for the IPS mode structure or the FFS structure. Then, scanning on the counter substrate side was performed simultaneously with scanning on the TFT substrate side, so that voltage of a predetermined polarity was applied. Specifically, in the case of scanning from the top to the bottom, positive polarity voltage was sequentially applied to the odd-numbered frames and negative polarity voltage was sequentially applied to the even-numbered frames.

[Additional Remarks]

Hereinafter, preferred modes of the first liquid crystal display device are described. These modes may be appropriately combined within the spirit of the present invention. Also, the modes may be applied to the second liquid crystal display device.

Preferably, the liquid crystal molecules are aligned in a direction parallel to the first substrate and the second substrate and perpendicular or parallel to the first direction in a voltage-off state in which voltage is not applied to any of the pair of electrodes, the pixel electrode, and the common electrode, and the alignment direction of the liquid crystal molecules is the same between the voltage-off state and the first display state. In this case, voltage applied between the pair of electrodes reinforces the alignment in the voltage-off state. Hence, the characteristics of the display mode in the present invention can be effectively utilized. In order to control the alignment in the voltage-off state, a horizontal alignment film is preferably provided on the liquid crystal layer side surface of the first substrate and/or the second substrate.

Preferably, the first linear portion and the second linear portion form an angle in the range of 60° to 85°. Since electric fields generated from the TFT substrate are vertical to the liquid crystal molecules if the angle is 90°, the rotational direction of the liquid crystal molecules may not be fixed, and alignment disorder may occur. In contrast, if the angle is made small, the rotational angle of the liquid crystal molecules cannot be large in switching of the display state from the first display state to the second display state. Accordingly, when the angle is set in the range of 60° to 85°, favorable alignment can be achieved. From the viewpoint of optimization of the response property and the display luminance, the angle is more preferably in the range of 70° to 85°, most preferably 75°.

The first liquid crystal display device may further include first and second polarizers that face each other with the first substrate and the second substrate in between, wherein the absorption axis of the first polarizer is perpendicular or parallel to the first direction and the absorption axis of the second polarizer is perpendicular to the absorption axis of the first polarizer. In this manner, by matching the direction of the absorption axis of the first or second polarizer and the extension direction of the first linear portions of the pair of electrodes provided to the first substrate, the first display state can be suitable for black display. In this case, preferably, the first display state provides black display and the second display state provides white display.

The liquid crystal molecules may have negative anisotropy of dielectric constant, be aligned in a direction parallel to the first direction in the first display state, and be aligned, in the second display state, in a direction different from the alignment direction of the first display state. When liquid crystal molecules having negative anisotropy of dielectric constant are used, the liquid crystal molecules can be surely prevented from being unintentionally vertically aligned to cause alignment disorder by the influence of the electric fields generated between the electrodes provided to the counter substrate and the electrodes provided to the TFT substrate. Also, since stable alignment is achieved, the transmittance (brightness) in the white display state can be made high.

The liquid crystal molecules may have positive anisotropy of dielectric constant, be aligned in a direction perpendicular to the first direction in the first display state, and be aligned, in the second display state, in a direction different from the alignment direction of the first display state. Although liquid crystal molecules having positive anisotropy of dielectric constant are more likely to cause alignment disorder, such liquid crystal molecules are advantageous in that there are various kinds of liquid crystal molecules so that liquid crystal molecules suited to the desired conditions can be selected. Accordingly, liquid crystal molecules with excellent temperature characteristics such as a high viscosity at low temperatures, and liquid crystal molecules having a large value for the anisotropy of dielectric constant can be used.

The pair of electrodes provided to the first substrate and a combination of pixel electrodes and a common electrode provided to the second substrate may both have the IPS mode electrode structure or the FFS mode electrode structure. The IPS mode electrode structure can reduce the number of layers constituting the first substrate and/or the second substrate, and thereby reducing the number of steps for formation of layers and patterning. Meanwhile, the FFS mode electrode structure can lower the probability of occurrence of a short circuit between electrodes, and can utilize the planar electrode to prevent the influence of static electricity from the exterior of the display device.

That is, the pair of electrodes may be a pair of comb-teeth electrodes (IPS mode electrode structure) whose comb teeth fit each other. Here, in the second substrate, a combination of the pixel electrode and the common electrode may be a combination of a planar electrode and an electrode in which an electrode slit is formed (FFS mode electrode structure), or may be a pair of comb-teeth electrodes whose comb teeth fit each other (IPS mode electrode structure).

Also, the pair of electrodes may be a combination of a planar electrode and an electrode in which an electrode slit is formed (FFS mode electrode structure). Here, in the second substrate, a combination of the pixel electrode and the common electrode may be a combination of a planar electrode and an electrode in which an electrode slit is formed (FFS mode electrode structure), or may be a pair of comb-teeth electrodes whose comb teeth fit each other (IPS mode electrode structure).

Hereinafter, preferred modes of the second liquid crystal display device are described. The modes may be applied to the first liquid crystal display device.

The frequency of the first electric field may be different from the frequency of the second electric field. In this case, the timing to apply voltage to the first substrate (counter substrate) side and the timing to apply voltage to the second substrate (TFT substrate) side are not necessarily matched. Also, the frequency of the first electric field is preferably higher than the frequency of the second electric field. Thereby, generation of flickers can be prevented.

REFERENCE SIGNS LIST 1, 2, 3, 4, 5: liquid crystal display device
10F, 10I: counter substrate
11, 21, 111, 121, 211, 221: substrate
14F, 14I: first counter electrode
14W: electrode width of first counter electrode
15: dielectric layer
16F, 16I: second counter electrode
16W: electrode width of second counter electrode
20F, 20I: TFT substrate
22, 122, 222: thin-film transistor
23, 123, 223: insulating film
24F, 24I, 124: common electrode
25, 125, 225: dielectric layer
26F, 26I, 126: pixel electrode
26L: linear portion
26S: electrode slit
26W: electrode width in pixel electrode
27, 127, 227: contact hole
30: liquid crystal layer
31: liquid crystal molecule having negative anisotropy of dielectric constant
32: liquid crystal molecule having positive anisotropy of dielectric constant
41: scanning line
42: signal line
60, 61: polarizing plate
131, 231: liquid crystal molecule
214: first electrode
224: second electrode
226, 228: drive electrode
SW1, SW2, SW3, SW4: electrode distance

The invention claimed is:

1. A liquid crystal display device comprising:
a first substrate that includes a pair of electrodes;
a second substrate that includes a switching element, a pixel electrode electrically connected to the switching element, and a common electrode; and
a liquid crystal layer that is disposed between the first substrate and the second substrate and contains liquid crystal molecules aligned in parallel to the first substrate and the second substrate, wherein
at least one of the pair of electrodes includes a first linear portion that extends in a first direction,
at least one of the pixel electrode and the common electrode includes a second linear portion that extends in a second direction intersecting the first direction,
the liquid crystal molecules are aligned in a direction perpendicular or parallel to the first direction in a first display state in which voltage is applied between the pair of electrodes and voltage is not applied between the pixel electrode and the common electrode,
the liquid crystal molecules are aligned in a direction different from an alignment direction of the first display state, in a second display state in which voltage is applied between the pair of electrodes and voltage is applied between the pixel electrode and the common electrode,
the liquid crystal molecules are aligned in a direction parallel to the first substrate and the second substrate and perpendicular or parallel to the first direction in a voltage-off state in which voltage is not applied to any of the pair of electrodes, the pixel electrode, and the common electrode, and
an alignment direction of the liquid crystal molecules is the same between the voltage-off state and the first display state.

2. The liquid crystal display device according to claim 1, wherein the first linear portion and the second linear portion form an angle in a range of 60° to 85°.

3. The liquid crystal display device according to claim 1, further comprising:
a first polarizer and a second polarizer that face each other with the first substrate and the second substrate in between,
wherein an absorption axis of the first polarizer is perpendicular or parallel to the first direction and an absorption axis of the second polarizer is perpendicular to the absorption axis of the first polarizer.

4. The liquid crystal display device according to claim 3, wherein the first display state provides a black display and the second display state provides a white display.

5. The liquid crystal display device according to claim 1, wherein the liquid crystal molecules have negative anisotropy of dielectric constant, are aligned in a direction parallel to the first direction in the first display state, and are aligned, in the second display state, in a direction different from the alignment direction of the first display state.

6. The liquid crystal display device according to claim 1, wherein the liquid crystal molecules have positive anisotropy of dielectric constant, are aligned in a direction perpendicular to the first direction in the first display state, and are aligned, in the second display state, in a direction different from the alignment direction of the first display state.

7. The liquid crystal display device according to claim 1, wherein the pair of electrodes is a pair of comb-teeth electrodes whose comb teeth fit each other.

8. The liquid crystal display device according to claim 7, wherein a combination of the pixel electrode and the common electrode is a combination of a planar electrode and an electrode in which an electrode slit is provided.

9. The liquid crystal display device according to claim 7, wherein a combination of the pixel electrode and the common electrode is a pair of comb-teeth electrodes whose comb teeth fit each other.

10. The liquid crystal display device according to claim 1, wherein the pair of electrodes is a combination of a planar electrode and an electrode in which an electrode slit is provided.

11. The liquid crystal display device according to claim 10, wherein a combination of the pixel electrode and the common electrode is a combination of a planar electrode and an electrode in which an electrode slit is provided.

12. The liquid crystal display device according to claim 10, wherein a combination of the pixel electrode and the common electrode is a pair of comb-teeth electrodes whose comb teeth fit each other.

13. A liquid crystal display device comprising:
a first substrate that includes a pair of electrodes;
a second substrate that includes a switching element, a pixel electrode electrically connected to the switching element, and a common electrode; and
a liquid crystal layer that is disposed between the first substrate and the second substrate and contains liquid crystal molecules aligned in a direction parallel to the first substrate and the second substrate, wherein
the liquid crystal display device has different directions of a first electric field generated by the pair of electrodes and a second electric field generated by the pixel electrode and the common electrode in a projection of the electric fields on a surface parallel to the first substrate and the second substrate,
the liquid crystal display device changes a strength of the second electric field while maintaining a strength of the first electric field so as to rotate an alignment direction of each liquid crystal molecule and thereby modulate display light, and
the liquid crystal molecules have negative anisotropy of dielectric constant, are aligned in the direction parallel to the first substrate and the second substrate and parallel to a first direction in which a first linear portion of at least one of the pair of electrodes extends, in a voltage-off state in which voltage is not applied to any of the pair of electrodes, the pixel electrode, and the common electrode, or the liquid crystal molecules have positive anisotropy of dielectric constant, are aligned in the direction parallel to the first substrate and the second substrate and perpendicular to the first direction in the voltage-off state in which voltage is not applied to any of the pair of electrodes, the pixel electrode, and the common electrode.

14. The liquid crystal display device according to claim 13, wherein a frequency of the first electric field is different from a frequency of the second electric field.

15. The liquid crystal display device according to claim 14, wherein the frequency of the first electric field is higher than the frequency of the second electric field.

16. A liquid crystal display device comprising:
a first substrate that includes a pair of electrodes;
a second substrate that includes a switching element, a pixel electrode electrically connected to the switching element, and a common electrode; and
a liquid crystal layer that is disposed between the first substrate and the second substrate and contains liquid crystal molecules aligned in parallel to the first substrate and the second substrate, wherein
at least one of the pair of electrodes includes a first linear portion that extends in a first direction,
at least one of the pixel electrode and the common electrode includes a second linear portion that extends in a second direction intersecting the first direction,
the liquid crystal molecules are aligned in a direction perpendicular or parallel to the first direction in a first display state in which voltage is applied between the pair of electrodes and voltage is not applied between the pixel electrode and the common electrode,
the liquid crystal molecules are aligned in a direction different from an alignment direction of the first display state, in a second display state in which voltage is applied between the pair of electrodes and voltage is applied between the pixel electrode and the common electrode, and
the liquid crystal molecules have negative anisotropy of dielectric constant, are aligned in a direction parallel to the first substrate and the second substrate and parallel to the first direction in a voltage-off state in which voltage is not applied to any of the pair of electrodes, the pixel electrode, and the common electrode, or the liquid crystal molecules have positive anisotropy of dielectric constant, are aligned in the direction parallel to the first substrate and the second substrate and perpendicular to the first direction in the voltage-off state in which voltage is not applied to any of the pair of electrodes, the pixel electrode, and the common electrode.

17. The liquid crystal display device according to claim 16, wherein the first linear portion and the second linear portion define an angle in a range of 60° to 85°.

18. The liquid crystal display device according to claim 16, further comprising:
a first polarizer and a second polarizer that face each other with the first substrate and the second substrate in between, wherein
an absorption axis of the first polarizer is perpendicular or parallel to the first direction and an absorption axis of the second polarizer is perpendicular to the absorption axis of the first polarizer.

19. The liquid crystal display device according to claim 16, wherein an alignment direction of the liquid crystal molecules is the same between the voltage-off state and the first display state.

* * * * *